Figures 137, 138, 139:
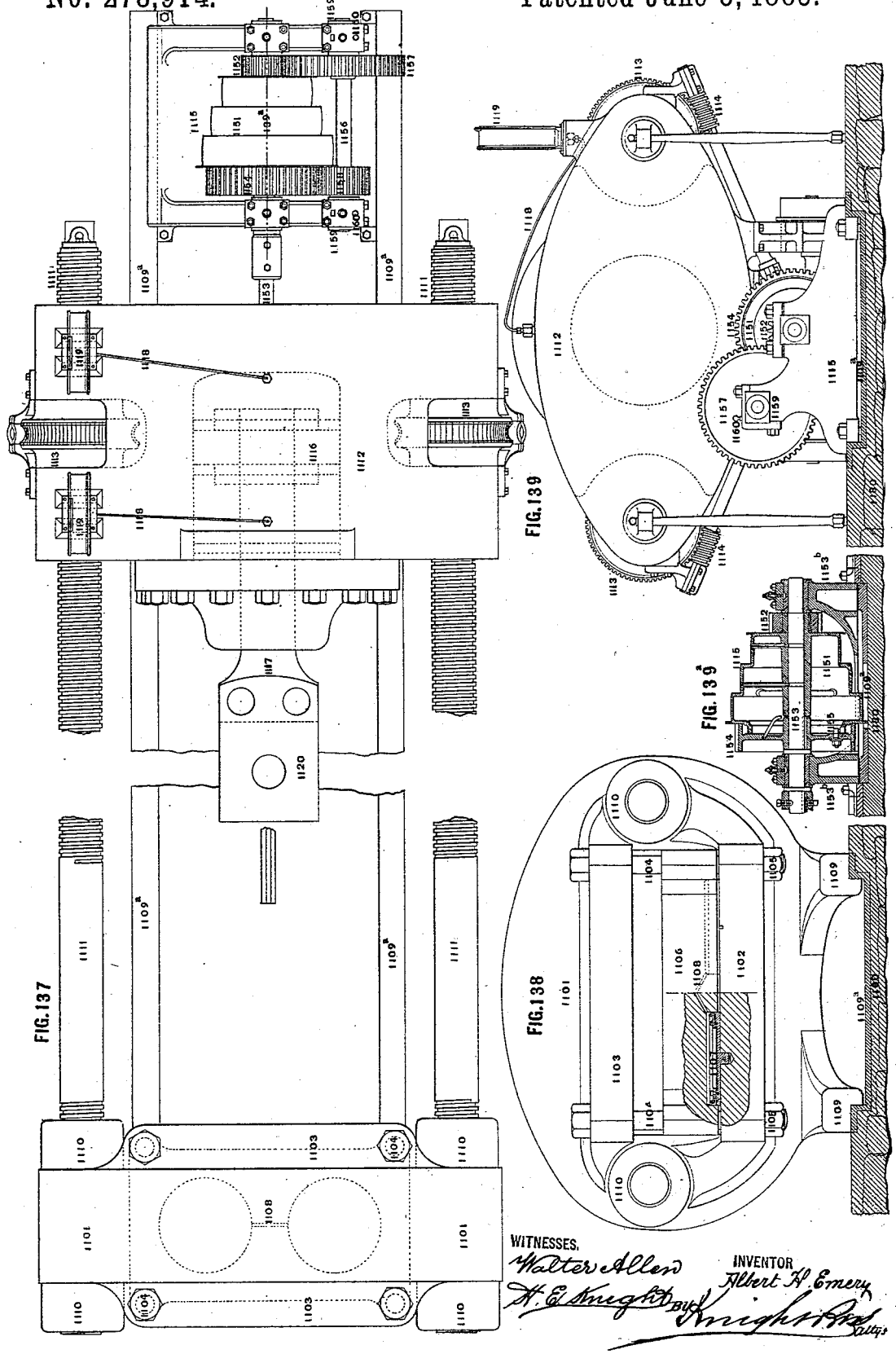

(No Model.)  4 Sheets—Sheet 1.

A. H. EMERY.
MACHINERY FOR TESTING THE STRENGTH OF METAL.

No. 278,914.  Patented June 5, 1883.

FIG. 139ᵃ

WITNESSES.
Walter Allen
H. E. Knight

INVENTOR
Albert H. Emery
By Knight Bros.
Attys

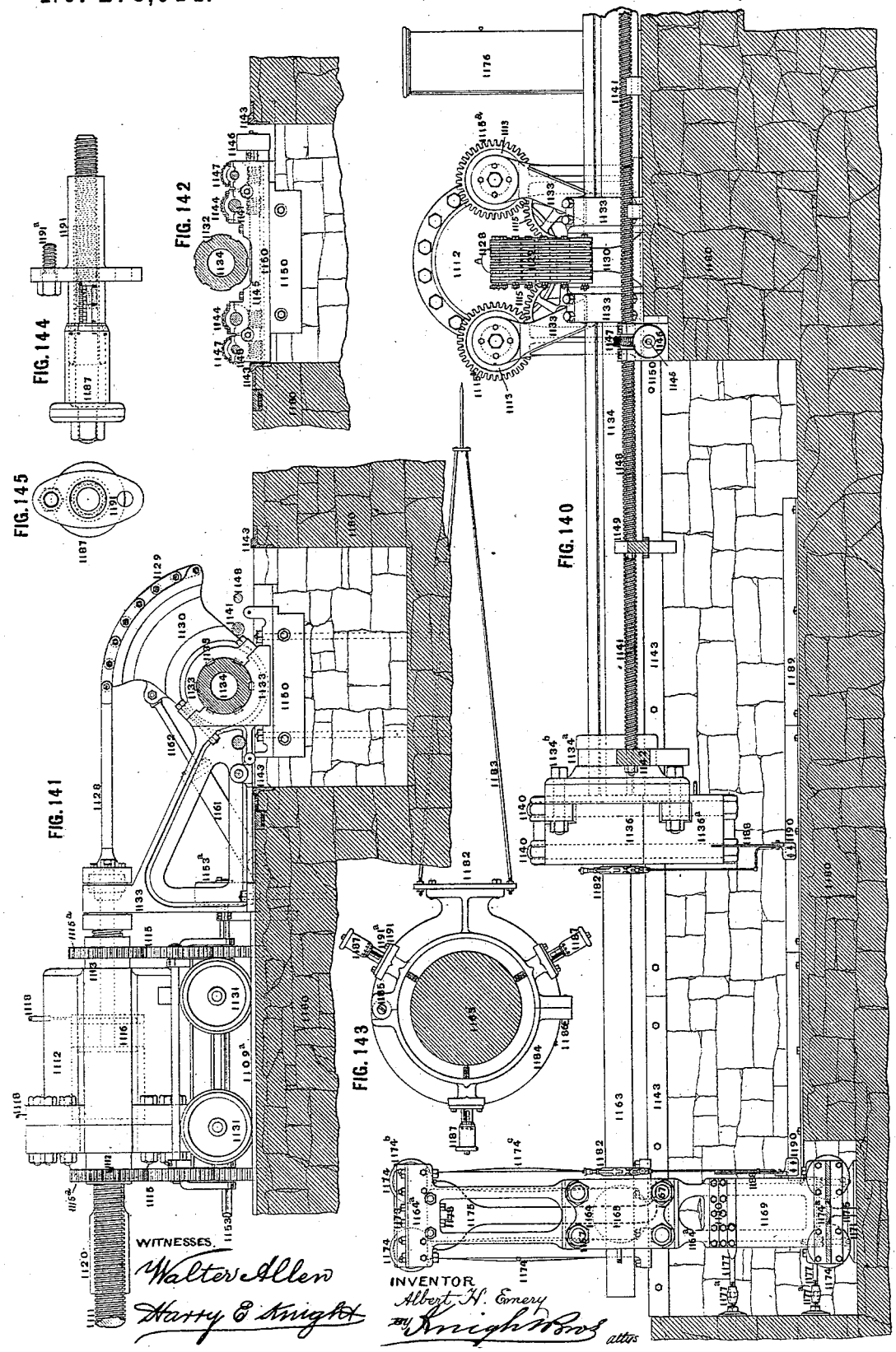

(No Model.)
A. H. EMERY.
MACHINERY FOR TESTING THE STRENGTH OF METAL.
No. 278,914. Patented June 5, 1883.
4 Sheets—Sheet 3.
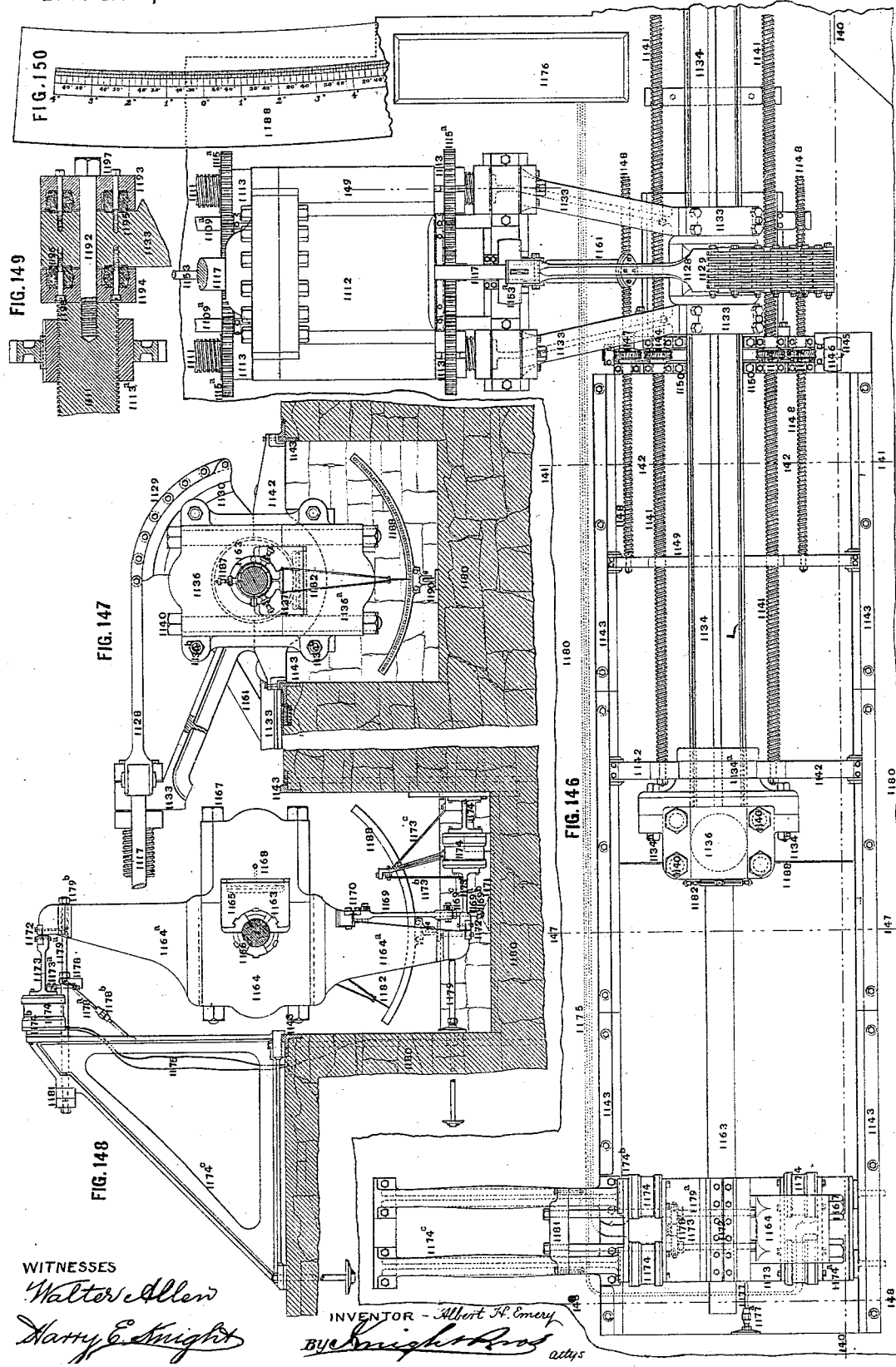

(No Model.) 4 Sheets—Sheet 4.

A. H. EMERY.
MACHINERY FOR TESTING THE STRENGTH OF METAL.

No. 278,914. Patented June 5, 1883.

WITNESSES
Walter Allen
Harry E. Knight

INVENTOR
Albert H. Emery
By Knight Bros
Attys

UNITED STATES PATENT OFFICE.

ALBERT H. EMERY, OF NEW YORK, N. Y., ASSIGNOR TO THE EMERY SCALE COMPANY, OF STAMFORD, CONNECTICUT.

MACHINERY FOR TESTING THE STRENGTH OF METAL.

SPECIFICATION forming part of Letters Patent No. 278,914, dated June 5, 1883.

Application filed February 5, 1881. (No model.)

*To all whom it may concern:*

Be it known that I, ALBERT H. EMERY, of the city, county, and State of New York, have invented certain new and useful Improvements in Machinery for Testing the Strength of Metals and other Materials, of which the following is a specification.

The machine in its simple form is adapted for producing and indicating strains of either tension, compression, transverse loads, or torsion on metallic bars, rods, plates, and other structures. The specimen is held at its respective ends by hydraulic pressure in a holding-beam and a straining-beam. The latter is moved in either direction either for adjustment or for producing a strain of tension or compression at will, and is provided or combined with a double-acting hydraulic press, which is employed either for producing the strains or, in connection with a gage or gages, for measuring the strains which may be produced by the movement of the straining-beam. The motion of the beam, either for straining or for adjustment, is effected by screws and nuts rotated by suitable gearing at variable speeds. For producing strains of torsion the apparatus is constructed with a torsional straining-bar adjusted longitudinally to suit different lengths of specimens, and working in a head, by which its rotation is imparted by means of a crank-arm, or a wheel and a chain, or band connected with the piston of the press or with the straining-beam, as the case may be. A secondary hydraulic press is employed in connection with the straining-arm for the purposes of a brake to regulate the motion or to restore the arm to its normal position, or in some cases for producing light strains. The torsion-bar is adjusted longitudinally by screws operated by nuts and sustained against flexure by a bar which is operated simultaneously by secondary screws, so as to keep it at all times midway between the torsion-head and the straining-arm. A hydraulic press is employed in the head to hold the specimen, in connection with three dies, which grip it radially on all sides. The torsional strain is transmitted through a stationary holder, fixing the specimen in the axis of the machine, constructed with hydraulic gripping-jaws and with arms secured against lateral motion by flexible fixing-plates, and imparting their pressure tangentially through flexible plates to supports connected through liquid-pressure chambers with suitable weighing apparatus to indicate the amount of the strain. By the use of two arms radial to the specimen-holder and projecting in opposite directions therefrom, unbalanced lateral strains are avoided. The supports and liquid-pressure chambers on which these arms bear communicate through pipes with a weighing apparatus common to both. The recoil movement of the holders is arrested by adjustable stops. To show the degree of torsion, indicators are attached at different points to the specimen, each indicator consisting of an arm fixed removably to a ring, which is clasped over the specimen and is centered thereon by radial set-screws suitably graduated. The degree of torsion is read on graduated arcs or circular dials fixed adjustably on one or more supporting-rails and set at the proper distance asunder.

Figure 151:
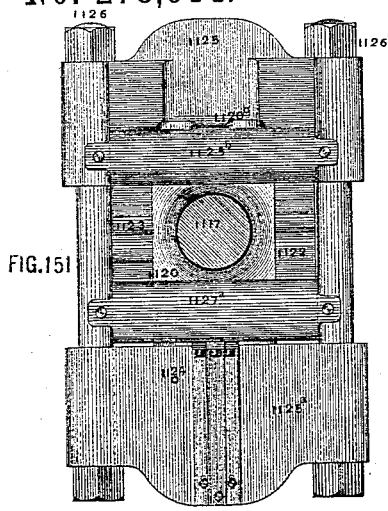
Figure 152:
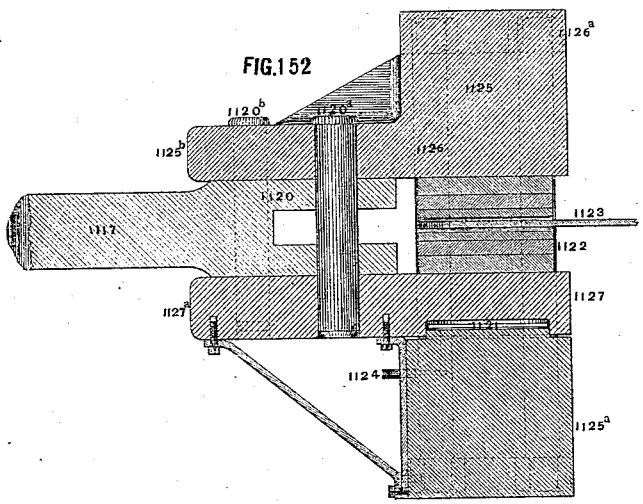
Figure 154:
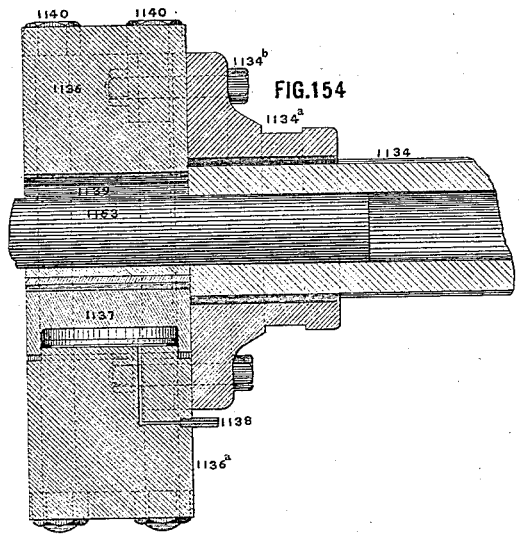
Figure 153:
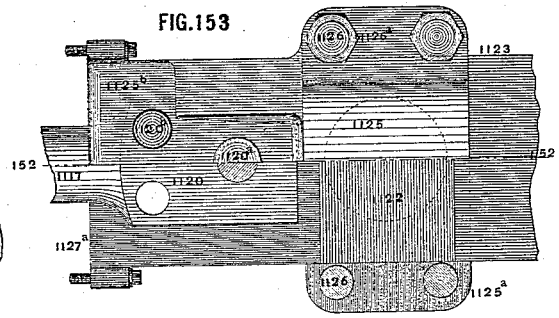
Figure 155:
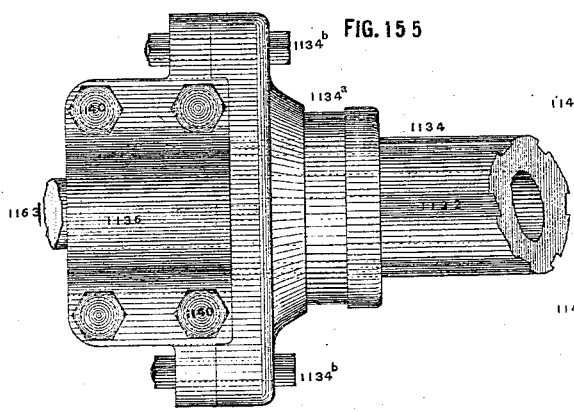
Figure 156:
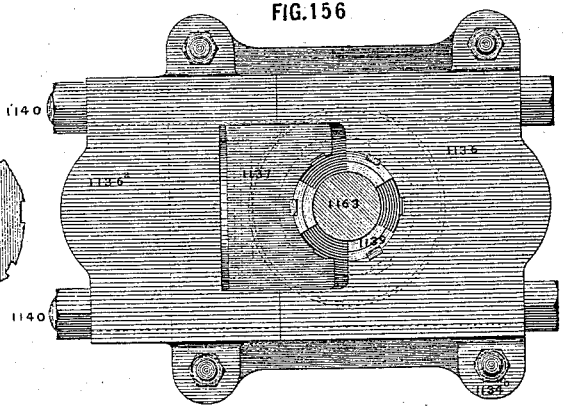

In the accompanying drawings the invention is represented in twenty-one views, numbered 137 to 156, inclusive. Figure 137 is a plan of a machine illustrating the invention as applied to tension and compression. Figs. 138 and 139 are end views of the same. Fig. 139$^a$ is a section on the line 139$^a$, Fig. 137. Fig. 140 is an elevation of the torsion end of the machine. Fig. 141 is an elevation of the straining-presses and straining-arm, with some parts omitted and others shown in section on the line 141 142, Fig. 146. Fig. 142 is a transverse section of the parts omitted in Fig. 141, the line 141 142, Fig. 146, indicating the plane of section. Fig. 143 is a front elevation, on a larger scale, of the indicator and its attaching-ring, showing a specimen in transverse section. Figs. 144 and 145 are elevations on a still larger scale of the set-screws of the indicator-attaching ring. Fig. 146 is a plan of the torsion end of the machine. Fig. 147 is an end elevation of the torsion-head and indicator and operating mechanism, showing a specimen in section on the line 147, Fig. 146. Fig. 148 is an elevation of the stationary holder, with section of masonry and specimen on line 148, Fig. 146. Fig. 149 is a longitudinal section, on a larger scale, of a portion of a pillar-block and main screw with buffer-springs and straining-nuts on line 149, Fig. 146. Fig. 150 is an elevation on a larger scale of a portion of the graduated indicator dial or arc. Fig. 151 is a rear view of the hydraulic holder, showing a section of the straining-rod. Fig. 152 is a sectional elevation of the same on the line 152, Fig. 153. Fig. 153 is a plan of the same. Fig. 154 is a sectional elevation of the torsion holder, head, and a portion of the torsion-bar and specimen. Fig. 155 is a plan of the same. Fig. 156 is a front elevation of the same, with the specimen in section.

In Figs. 137 to 139, 1101 represents a holding-beam constructed with a bed-plate, 1102, and a cap or platen, 1103, preferably made in one piece, and strengthened by clamp screws or bolts 1104 and nuts 1105.

1106 is a follower recessed underneath for the reception of a pair of hydraulic rams, 1107, which are connected by a liquid-duct, 1108, and operate to force up the follower 1106. In the simple form here shown the hydraulic holder is adapted for grasping a flat plate. Where bars or other specimens of round or any other shape are to be held, suitable dies to hold them are placed between the follower 1106 and platen 1103. The holding-beam rests, through legs 1109, on ways 1109$^a$ on a stationary bed, and is clamped at each end between a pair of nuts, 1110, on screws 1111, to the other end of which the straining-beam 1112 is movably connected by two or more nuts, 1113. In the illustration given in Fig. 139 these nuts 1113 are two in number—one at each end of the beam 1112—and are constructed in the form of worm-wheels rotated by the worm-shafts 1114 and train of gearing 1115. The rotation of the nuts by this means moves the beam backward or forward on the stationary screws 1111. The straining-beam 1112 contains a hydraulic piston, 1116, working in a cylinder, and connected with a rod, 1117, so as to constitute a double-acting hydraulic press, either for purposes of applying a strain to a specimen or to gage a strain which is applied by the screw-gearing 1111 1113 1114 1115.

1118 represent pressure-pipes for conducting liquid to operate the press, or for conducting it from the press to the gages 1119, by which the strain may be measured or registered. If the strains are produced by liquid pressure, the liquid to operate the press is conducted through a pipe at bottom. (Not here shown.) The straining-bar 1117 is constructed with a head, 1120, which is provided with a hydraulic or other suitable holding device. It is preferred to hold the specimens by a hydraulic holder on the straining-head, substantially such as is shown in detail in Figs. 151, 152, 153. The said holder is provided with a hydraulic ram, 1121, and dies 1122, made to fit the particular specimen which is to be held, consisting in the present illustration of a flat plate, 1123.

1124 is the small pipe for conducting the pressure-liquid to the ram.

The holder consists of two beams, 1125 1125$^a$, secured together by bolts 1126 and nuts 1126$^a$, and a beam or follower, 1127, which is operated by the ram 1121, and clamps the specimen by means of the dies 1122. The holder is connected to the straining-head by pins 1120$^a$ 1120$^b$, passing through it and through parts 1127$^a$ 1127$^b$ of the beams 1127 and 1125.

In Figs. 140, 141, and 146 the adjusting or straining nuts 1113 of the straining-beam 1112 are shown as four in number and driven directly by a band-wheel, 1153$^a$, shaft 1153, and cog-gearing 1115 1115$^a$, without the intervention of the screws 1114. This direct gearing is used for imparting light strains or for adjusting the straining-beam where it is used in connection with a hydraulic press for producing the strains. When the hydraulic press is used simply as a gage, the piston-rod connected therewith is stayed within the straining-beam by flexible fixing-plates, and the liquid-pressure chambers are sealed, so as to operate on separate gages 1119 without external connection.

To adapt the machine for use for torsional strains, the straining-bar 1117 is extended completely through the straining beam or press 1112, and is connected, as shown in Figs. 140, 141, 146, 147, by a link or rod, 1128, to a chain, 1129, which passes around the crank-arm 1130. The end of this arm may constitute an arc of any necessary length, or it may form an entire wheel when necessary. The straining beam or press is in this illustration mounted on wheels 1131, running on rails or ways 1109$^a$, as the beam is moved in either direction by the rotation of the nuts 1113 on the screws 1111 either for adjustment or straining. The hub of the crank arm or wheel 1130 receives concentrically within it a hollow shaft, 1134, constituting the torsion-bar, and turning within bearings in pillar-blocks 1133, which hold the hub against lateral motion. The torsion-bar 1134 is adjustable longitudinally within the crank arm or wheel 1130, and derives rotation therefrom by splines or keys 1135, which fit in grooves 1132 of the torsion-bar, as illustrated in Fig. 141. The adjustable hollow torsion-bar 1134 has keyed to its extremity a head, 1134$^a$, to which is attached by bolts 1134$^b$ a hydraulic holder adapted to hold a specimen, any necessary length of which may be passed within the hollow torsion-bar. The hydraulic holder is constructed, as illustrated in Figs. 154, 155, 156, with two beams, 1136 1136$^a$, tie-rods 1140, and a follower, 1137.

1138 is the liquid-pressure pipe.

1139, Fig. 156, are three opposing dies, two of which are mounted in the fixed portion of the holder-beam 1136, while the other is carried by the follower 1137. The relative position of these dies will be seen to adapt them to grasp with great force a specimen or rod of round or other form and to center it within the torsion-bar. The adjustment of the torsion-bar 1134 is effected by means of screws 1141, Figs. 140, 141, 146, fixed to a cross head or beam, 1142, which runs on ways 1143, and constitutes the bearing in which the torsion-bar 1134 is rotated. The screws 1141 are moved back or forth by the rotation of worm-nuts 1144, rotated by a transverse worm-shaft, 1145, which may be driven by a band-pulley, 1146. The shaft 1145 drives also a second pair of worm-nuts, 1147, which are threaded to fit secondary screws, 1148, clamped at their extremities to a transverse beam, 1149, which works on the ways 1143, and is employed to support and stay the torsion-bar 1134 and screws 1141 at a point between the stationary beam 1150 and the movable beam 1142. In order to effect the proper relative motion of the beams 1149 and 1142 for this purpose, the screws 1148 are made of one-half the pitch of the screws 1141, so that a simultaneous rotation of the two pairs of nuts 1144 and 1147 will move the beam 1142 twice as far as the beam 1149. The latter is thus kept midway between the beams 1142 and 1150 in all positions of the moving beam 1142. In the present illustration the screws 1141 are shown as double-threaded and the screws 1148 as single-threaded. The beam 1112 is moved for straining purposes at variable speeds by a variable live head, 1115. (Shown in plan in Fig. 137, in elevation in Fig. 139, and in longitudinal section in Fig. 139$^a$.) This live head is constructed with the customary connected set of differential cone-pulleys, 1151, and pinion 1152, running loosely on the shaft 1153, to which the gear-wheel 1154 is keyed, and adapted to be rigidly connected to said wheel at will by a dog, 1155, and with an adjustable back-gear shaft, 1156, carrying the wheel 1157, and pinion 1158, keyed thereto and gearing with the cone-pulley pinion 1152 and shaft-wheel 1154, respectively. The boxes 1159 of the back-gear shaft 1156 are held in either position by keys 1160, to hold the back gears either in or out of mesh with those of the shaft 1153.

In Fig. 141, 1161 represents a secondary hydraulic press connected by a rod, 1162, with the crank-arm 1130, or to a separate arm, if preferred, and employed for various purposes. It serves as a brake to check the movement of the arm under the draft of the main straining-press. It also serves as a backing device to restore the arm 1130 to its normal position. It is also used in some cases for applying strains when the power of the main press is not required.

The fixed end of the specimen 1163, which is to receive a torsion strain, is secured in a stationary holder, 1164, by a hydraulic press, 1165, Fig. 148, and three dies, 1166, operating in the same way as those already described in connection with the straining-holder.

1167 represent bolts and nuts by which the two parts of the stationary holder are secured together against the strain of the press 1165.

1168 is the liquid-pressure pipe.

The stationary holder 1164 is formed with projecting arms 1164$^a$, and is supported by a wide standard or plate, 1169, flexibly connected to it by a thin plate, 1170, and resting, through the medium of struts 1169$^a$, on a step, 1171, which is formed with suitable seats in which the said struts may turn. Angular collars 1169$^b$ on the struts 1169$^a$ permit the turning thereof, and they are threaded at their upper ends to fit tapped sockets in the plate 1169.

1169$^c$ are lock-nuts to fix the struts relatively to the plate or standard in any position in which they may be adjusted.

The stationary holder which transmits the strain to the weighing apparatus serves also to support and fix the specimen concentrically in the axis of the machine, and is thus clearly distinguished from an arm attached to the specimen only for the purpose of transmitting the strain of torsion. The extremities of the arms 1164$^a$ are connected by flexible transmitting-plates 1172 with flanged plates 1173, bolted to the caps of hydraulic-pressure supports 1174, from which the pressure is transmitted through liquid-pressure pipes 1175 to weighing apparatus 1176, of any suitable construction. The lower supports 1174 are fixed to a beam, 1174$^a$, bolted to bearing-plates set in the masonry 1180. The upper supports 1174 are bolted to a beam, 1174$^b$, and braced supports 1174$^c$, the latter being bolted to the masonry 1180. The construction of the supports and of weighing apparatus suitable for use in this machine will be found described in detail in other applications.

Lever-scales or other appliances for weighing or measuring the strains transmitted by the plates 1172 may be substituted for the hydraulic weighing apparatus, if preferred. The weight of the support-caps and of the attached plates 1173 is sustained by a frame-work, so as to relieve the moving parts of the support from any vertical strain.

At the upper part of the machine, in Fig. 148, the support-cap and its connections are shown resting by a flexible plate, 1173$^a$, on a bracket formed by the rod 1179$^a$, beam 1178, and a brace or strut, 1178$^a$, made in two parts, with right and left screw-threads, on which works a double screw-nut, 1178$^b$, for adjusting the brace-rod in length. At the lower part of said figure the weight of the support-cap and its attachments is supported by a suspension-rod, 1173$^b$, and bracket 1173$^c$. The holder-arms 1164$^a$ are adjusted laterally and fixed in position by double screw-rods 1177 and double screw-nuts 1177$^a$, working thereon, as shown in Figs. 140 and 146.

1179 1179$^a$ represent adjustable stops to take up the recoil movement of the holder. The upper stop-rod, 1179$^a$, passes through the upper holding-arm without contact, and arrests its backward movement by means of a nut, 1179$^b$. The rod 1179$^a$ is adjusted in height by the brace-rod 1178$^a$ and nut 1178$^b$, so as to adapt it to work within the aperture of the arm 1164$^a$ without friction. The rod 1179 receives the recoil of the lower arm upon its end, as shown.

The rod 1179 is set adjustably in the masonry 1180, and the rod 1179ª is fixed in the beams 1178 and 1181. The rod 1179 and nut 1179ᵇ are set nearly in contact with the arms, so as to prevent any sensible recoil movement in the event of the breaking of a specimen.

The angle of torsion produced by the strain is accurately measured by indicators 1182, applied to the specimen itself. The construction and application of these indicators are illustrated in Figs. 140, 146, 147, and 148, and on a larger scale in Fig. 143. Each consists of an arm or index, 1183, removably attached to a ring, 1184, which is hinged at 1185 and fastened by a screw, 1186, around the specimen. It is preferred to apply to the ring three or more equidistant radial indicator-arms, in order to correctly show the angle of torsion in the event of the shaft being deflected. To correctly center the indicator on the specimen, three or more set-screws, 1187, are employed, said screws being threaded within seats 1191, fastened by screws 1191ª to the ring 1184, said seats being graduated, as represented in Fig. 144, to show the equal insertion of the screws. Figs. 144 and 145 show on a larger scale the screw, the indicating-case thereof, and the graduated seat. The indications of the pointers are read on graduated arcs 1188, attached adjustably to a rail, 1189, by clamps 1190. By the application of two of these indicators to the specimen at any determined distance apart, as illustrated in Fig. 140, the precise amount of torsion produced by a given strain is accurately shown. By observing the relative deflection of the indicators when applied at different points on the specimen, any weak parts thereof may be discovered. A portion of one of the indicator-arcs is shown in Fig. 150. These arcs may each constitute an entire ring or any part thereof, as the capacity or purposes of the machine may render necessary.

To take up the recoil of the straining-beam and its connections in the event of the breaking of a specimen, the device shown in Fig. 149 is employed. The screws 1111 are connected to the housing 1133 by clamp-screws 1192, attached in the ends of the said screws 1111 and passing through boxes 1193 1194, containing annular springs 1195 1196, each consisting of a continuous ring of rubber. The boxes are held to the housings by tap-screws 1197 1198. It will now appear that in the event of the breaking of a specimen under a torsional strain, the screws 1111 being relieved from the compressive force of the straining-beam, the said beam will recoil and by its inertia draw the screws 1111 away from the housings, drawing on the screw 1192, compressing the springs 1195, and drawing the ends of the screws 1111 away from the boxes 1194 for the instant. The recoil of the springs 1195 will restore the screws 1111 to contact with the boxes 1194, the springs 1196 yielding under the compression and afterward restoring the parts to their normal positions.

Whatever novel subject-matter I have described and not claimed or attempted to claim herein I have claimed or attempted to claim in other applications or have reserved to be claimed in future original applications.

The following is here claimed as new:

1. In a testing-machine, the combination of a fixed or stationary bed or bearing, a straining-beam, and two or more connecting screws or rods, adapted and arranged to operate with a strain of either tension or compression on the screws while applying strains to the specimen.

2. A fixed beam or beams, a straining-beam, and suitable screws and connections, adapted and arranged to apply at will a strain of tension to the specimen and compression to the screws, or vice versa.

3. The combination, with the straining-beam and fixed screws, of nuts actuated by suitable mechanism and moving the beam on the screws, for applying strains of tension or compression and for setting and locking the beam in any desired position for receiving a strain applied to the specimen.

4. The combination, in a testing-machine, of a straining-rod, 1117, a straining-beam, 1112, screw-gearing for producing the strain, a piston, 1116, receiving the load-pressure, a hydraulic-pressure chamber, and a gage for measuring the pressure, substantially as set forth.

5. The combination, in a testing-machine, of a straining-beam, screw-nuts and gearing for producing a strain of tension or compression at will, a straining-rod, a piston, two hydraulic-pressure chambers, and one or more gages for measuring the pressure, substantially as set forth.

6. The construction and combination of the holding-beam 1101 and its contained holding press or presses 1107, substantially as set forth.

7. In a testing-machine, the combination of a stationary bed or bearing, a straining-beam, two or more connecting-screws adapted to operate with a strain of either tension or compression on the said screws while applying strains to the specimen, a shaft and gearing for moving the straining-beam, and mechanism for driving the shaft and gearing at variable speeds, substantially as set forth.

8. A torsional straining-bar adjustable longitudinally to suit different lengths of specimens.

9. The combination, with the straining-bar, of one or more pillar-blocks and a straining arm or wheel adapted to permit the sliding of the bar within it for longitudinal adjustment, substantially as set forth.

10. The combination, with a torsion-bar, of a crank arm or wheel and one or more hydraulic presses, as and for the purposes set forth.

11. The combination of a straining beam or press, a longitudinally-adjustable torsion-bar, a crank arm or wheel, and suitable connections, substantially as set forth.

12. The combination, with a torsion-bar and straining arm or wheel, of a straining beam or press suitably connected to said arm or wheel, and screws for moving the said beam or press to rotate said torsion-bar.

13. The combination, with a straining beam or press, one or more straining arms or wheels, a torsion-bar, and suitable connections, of a secondary press arranged for optional use either in conjunction with the main beam or press or separately.

14. The combination, with a torsion-bar and a straining arm or wheel, of a hydraulic press suitably connected to said arm or wheel for applying heavy strains, and movable by screws and nuts to apply strains requiring less power or greater angular motion.

15. The combination, with the torsion-bar, of a flanged head adapted for the attachment of a suitable holder, as set forth.

16. The combination, with the torsion-bar 1134, of the movable beam 1142, employed to support the forward end of the bar and move the same as required for longitudinal adjustment.

17. The combination, with the torsion-bar 1134 and supporting and adjusting beam 1142, of the screws and nuts for moving the said beam.

18. The intermediate supporting-beam, 1149, and screws 1148 for adjusting the same, in combination with the adjustable torsion-bar 1134, for the purposes set forth.

19. The combination of the hydraulic holder with the torsion-bar 1134 and head 1134$^a$, substantially as set forth.

20. The combination, with the holder-beams 1136 1136$^a$ and follower 1137, of the three dies 1139 1139 1139, arranged as shown, for holding the specimen.

21. A supporting-holder, stationary or nearly so, deriving torsional strains from the specimen under test, and transmitting said strains through an arm or arms to a suitable indicating apparatus to show the torsional strain.

22. A stationary holder deriving torsional strains from the specimen under test, substantially as described, and transmitting said strains to an indicator through the medium of two or more arms projecting from different sides of the holder.

23. The flexible supporting-plate 1170, in combination with the holder 1164, substantially as and for the purposes set forth.

24. In combination with the arm or arms of the holder and a suitable indicating device, one or more flexible plates, 1172, for transmitting the strain from the arm or arms to the indicating device, substantially as set forth.

25. The combination of the holder 1164, arm or arms 1164$^a$, transmitting-plates 1172, and suitable connections with weighing or measuring apparatus for indicating the strain transmitted through said holder.

26. The combination, with the holder, of the check-pieces 1179 1179$^a$ for arresting any recoil movement of said holder.

27. One or more indicators applied to the specimen under test, between the holders, to measure the angle of torsion.

28. The method of determining the torsion of any portion or portions of a specimen by applying two or more indicators to the specimen at different points between the holders, substantially as set forth.

29. In a machine for testing torsional strains, the indicator, constructed, as herein set forth, with a ring and three or more radial set-screws for centering the indicator on the specimen.

30. In combination with the ring 1184 and arm or arms applied thereto, three or more graduated set-screws for adjusting the indicator or indicators concentrically with the specimen, substantially as set forth.

31. The combination of the removable arm or index 1183 with the ring 1184 and set-screws, operating substantially as set forth.

32. In a torsion-testing apparatus operating substantially as set forth, the graduated arc 1188, secured adjustably by a clamp or clamps to a supporting rail or rails, as explained.

33. The combination of two graduated arcs with indicators adapted for direct application to a specimen at points between the holders, to indicate the relative torsion of different parts thereof.

34. The combination, in a testing-machine, of a fixed beam or beams and a double-acting hydraulic press adjustably connected thereto, for producing strains of either torsion or compression, as set forth.

35. The combination, with the fixed beam or beams, the straining beam or press, and the connecting-screws, of nuts operating against the straining beam or press in either direction, for straining or for adjustment.

ALBERT H. EMERY.

Witnesses:
OCTAVIUS KNIGHT,
WALTER ALLEN.